United States Patent [19]

Leathers

[11] 3,897,530

[45] July 29, 1975

[54] METHOD FOR GUSSETING CONTINUOUS LENGTHS OF TUBULAR MATERIAL

[75] Inventor: Joel M. Leathers, Midland, Mich.

[73] Assignee: The Dow Chemical Company, Midland, Mich.

[22] Filed: Oct. 27, 1972

[21] Appl. No.: 301,679

[52] U.S. Cl............... 264/89; 93/84 FF; 93/84 TW; 264/90; 264/95; 264/209; 264/285; 425/388
[51] Int. Cl............................................ B29c 17/02
[58] Field of Search ............ 264/89, 90, 92, 95, 99, 264/280, 285, 295, 209; 425/388; 93/1 F, 20, 35 PT, 84 FF, 84 TW

[56] References Cited
UNITED STATES PATENTS

| 331,721 | 12/1885 | Lorenz et al.............................. 93/20 |
| 407,814 | 7/1889 | Burdick ..................................... 93/35 |
| 2,542,652 | 2/1951 | Freund...................... 93/84 TW UX |
| 2,544,044 | 3/1951 | Reber et al. ............................ 264/95 |
| 3,274,315 | 9/1966 | Kawamura....................... 264/209 X |
| 3,543,334 | 12/1970 | Sudo.................................. 264/95 X |

Primary Examiner—Jan H. Silbaugh
Attorney, Agent, or Firm—Burke M. Halldorson

[57] ABSTRACT

Moving tubing, such as of plastic film, is continuously gusseted in the longitudinal direction, by pulling apart opposed side sections of the tubing, at a local station by application of vacuum force selectively to the surface of the tube, leaving one or more section(s) of the tubing free of such vacuum force, and continuously inwardly tucking such free section(s) by means of gusset blade(s) or the like, or alternately by means of atmospheric force pressing inwardly on said free section(s). In species embodiments of the invention, the vacuum suction is applied by means of opposed perforate belts or rolls through which the vacuum is pulled, and which are operated at essentially the same rate of speed as the forward movement of the tubing.

4 Claims, 6 Drawing Figures

METHOD FOR GUSSETING CONTINUOUS LENGTHS OF TUBULAR MATERIAL

BACKGROUND OF THE INVENTION

This invention discloses a new technique for gusseting continuous tubing wherein the material of the tubing is of a generally imperforate character to the free passage of gas or air.

The invention particularly applies to plastic film or sheet tubing since this material is frequently gusseted along one or more edges, in the common practice of converting the tubing into plastic bags of a type incorporating a gusset structure. The term "gusseting" as used in this disclosure refers to art of tucking an edge(s) of the tubing inwardly along a continuous longitudinal section thereof such that the cross section of the edge resembles, for example, a flattened "W", or alternately a series of W's where several adjacent and distinct inward tucks are performed.

The past standard practice for gusseting plastic tubing is exemplified by the steps of injecting inflating gas into the tube, to expand the same to a generally full condition, pinching the inflated tube such as by nip rolls to trap the gas pressure therewithin, and thereby establish an inflated section of tubing just prior to the indicated nip rolls, and while advancing the tube, applying a gusseting blade(s) or the like to a side portion of such inflated section to continuously tuck such side portion inwardly.

Frequently such gusseting steps are performed simultaneously with the extrusion of the tubing by the so-called "bubble" process. As a characterizing step of this process, the plastic melt is extruded as continuous inflated tube, and at a point remote from the extrusion die, the tube is collapsed to trap the inflating gas therewithin, thereby forming a bubble or inflated section in a sense suitable for the noted gusseting procedure.

As is inherent to this procedure, the gusseting blade(s) places a physical drag on the somewhat delicate tube, which, of course, varies in degree depending largely on the speed of manufacture, the relative slip values along the contacting surfaces, the amount of contact, and the extent of firmness or resistance of the tube to the inward deformation forced thereon by the blade(s). Understandably, a certain amount of drag can be tolerated. However, particularly as the speed of manufacture is increased to maximum attainable rates, such as is possible using liquid quenching or cooling practices, the drag produced by the blades can build to a level that it becomes a destructive and/or unstabilizing force in the manufacture of the film.

Moreover, the apparent efficiencies of utilizing the bubble formed off the extrusion die for gusseting, can be offset in instances where the film is to be cooled by liquid quenching, particularly in the manner shown in U.S. Pat. Nos. 3,090,998 and 3,337,663. Here the folds of the gusset tend to capture and entrain droplets of the quenching liquid, which can subsequently interfere with heat sealing the film unless the film is first properly dried. Since the droplets are concealed within the folds of the gusset, the film is not as easily dried in the area of the gussets, such as by forced air drying. As a result the film may not be properly ready for immediate conversion into plastic articles, such as plastic bags.

Accordingly, it would be of advantage if there were made available to the art, an improved technique for forming continuous longitudinal gussets in tubular material, and particularly a technique which placed minimal physical drag on the material in effecting the gusseting steps.

It would be of even further advantage in such art, particularly in certain instances of manufacture, if drag against the side of the tube could be essentially eliminated, by eliminating the customary gusseting blade(s), employed in the past to form the inward tuck required to gusset the tube.

It would be of yet further advantage to the art, if tubular film material could be effectively gusseted utilizing a minimal internal pressure to prepare the film for gusseting.

It would be of still further advantage to such art, if such gusseting steps could be readily performed in line with the manufacture of the material, and in a manner noninterfering such as with liquid quenching techniques, where practiced.

It would be of yet even further advantage if in instances where desired or most practical, such gusseting steps could be performed exclusive of the manufacturing operation, as for example, for purposes of gusseting continuous lengths of tubular material fed from a compact storage source, such as from a mill or storage roll.

SUMMARY OF THE INVENTION

Briefly, these and other related features and advantages of the invention are achieved utilizing the cooperative action between a gusseting blade(s) or its equivalent, and/or atmospheric pressure, together with vacuum induced suction applied selectively to the tubing, to the end result of gusseting the tubing continuously in the longitudinal direction. Where it is necessary, as in high speed film manufacture, to gusset the material without causing a substantial physical drag thereon, the vacuum suction can be applied through moving belts or rolls which engage the tubing, and travel at the same rate thereas. Also negative gauge pressure can be maintained within the tubing, whereby those certain areas of the tubing, not restrained or held by vacuum suction, are collapsed inwardly solely by or with the assistance of atmospheric pressure, to form the desired gusset structure. In instances where a gusseting blade(s) is used, most preferably a slight positive gauge pressure is maintained within the tubing. The invention can be practiced simultaneously with the manufacture of the tubing, or separately therefrom.

Further features and advantages of the invention will become more apparent from the following specification taken in conjunction with the drawing wherein.

DESCRIPTION OF THE PREFERRED EMBODIMENTS

Figure 1:
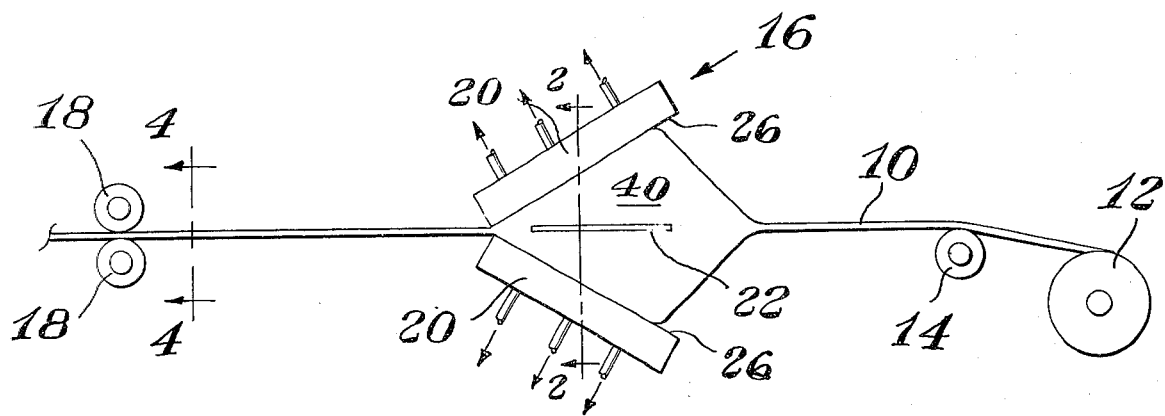
FIG. 1 is a side elevational view illustrating in somewhat abbreviated and schematic form, apparatus constructed according to the general teachings and principles of the present invention.
Figure 2:
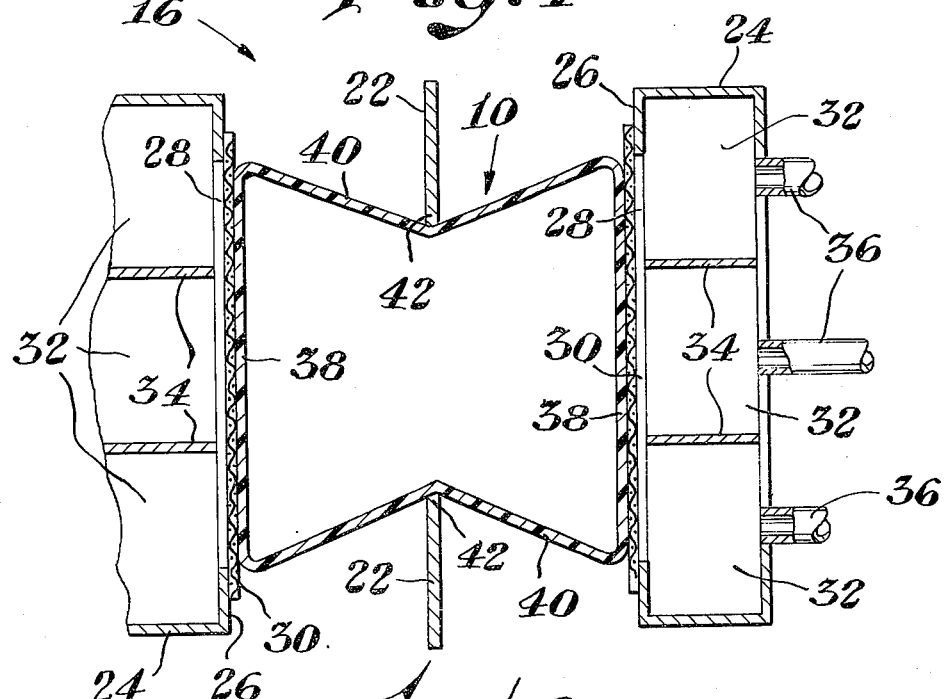
FIG. 2 is a cross-sectional view of the apparatus of FIG. 1 taken along reference line 2—2 thereof.

Referring now more particularly to the drawing, and specifically the embodiment of the invention as shown in FIGS. 1 and 2, plastic tubular film 10 is fed from a compact storage source such as a mill roll 12, over an idler roll 14 to a film gusseting station designated generally as 16, and then eventually onto and between a pair of driven nip rolls 18.

Figure 3:
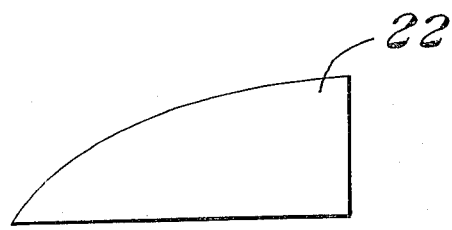
FIG. 3 is a side elevational view illustrating separately, an applicable configuration of a gusseting blade as may be employed as a part of the apparatus of FIG. 1.

The gusseting station, in the form illustrated, comprises a pair of independent vacuum suction sources 20, arranged cooperatively with a pair of opposed spaced apart film guide members 22. The latter may each take the form of a gusseting blade such as of a configuration as shown separately in FIG. 3.

Vacuum suction sources may be constructed as shown in some detail in FIG. 2, each comprising a hollow vacuum box or enclosure 24 defining a flat vacuum suction face 26. A relatively large cut-out or aperture 28 is defined centrally in each vacuum suction face. An air transmitting material, preferably a wire mesh 30, is fastened as a covering over each aperture. Vacuum boxes 24 are each internally divided into a plurality of relatively small, independent compartments 32, such as by means of a matrix of internal dividers 34. Each such compartment communicates between the wire mesh 30, and one of a plurality of vacuum hoses or connections 36, which fit into the back side of vacuum boxes 24, respectively.

Now referring more specifically to the operation of the described apparatus, to begin start-up, a small amount of air or other suitable gas is injected into the leading end of the tube, preferably to inflate the tube to a slight positive gauge pressure, as will be discussed more fully hereinafter. The nip rolls serve to pinch the tubing closed, and thereby retain the inflating gas, and also serve to advance the tubing.

In starting the gusseting station, the vacuum boxes 24 may be moved inwardly if necessary, until contact and secure retention by vacuum suction is established between vacuum suction faces 26 and opposed surface areas, or sections 38, respectively, of the tubing (see FIG. 2). Thereafter, the vacuum boxes may be moved to the particular positioning desired thereof, and which will best facilitate the gusseting of the tubing in cooperation with gusseting blades 22. In this instance the vacuum boxes are converged inwardly toward each other in the direction of advancement of the tubing, and into near touching contact adjacent the forwardmost extent thereof. Manual shaping of the inflated tube to intimately conform the same to all contacting surfaces, i.e., blades 22 and vacuum suction faces 26, may be necessary in the start-up stage.

Figure 4:
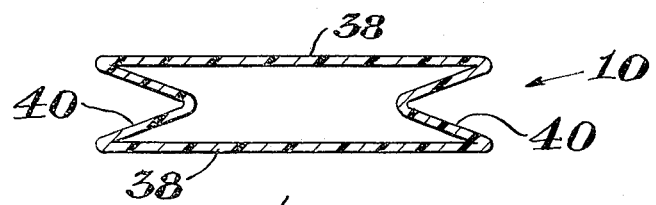
FIG. 4 is a cross-sectional view of tubular film as gusseted by means of practice of the teaching herein, and is taken along reference line 4—4 of FIG. 1.

Once the start-up is completed, the tube is thereafter continuously advanced, whereby sections 38 are continuously sucked apart in the locality of gusseting station 16, and advance through such station, in intimate sliding contact against vacuum suction faces 26, respectively. The application of such vacuum is in a select manner, designed to leave opposed surface areas or sections 40 of the tube free of the applied vacuum force, and which are generally of a width corresponding to the depth desired of the gussets. The free sections 40, are presented in a condition in which the same may be continuously tucked inwardly by sliding contact against the inwardmost edges 42 of gusseting blades 22, respectively, whereby the tube assumes the gusseted shape as shown separately in FIG. 4. The film is subsequently flattened between nip rolls 18 to permanently retain the gusseted structure in the tube. The tube may thereafter be wound on a storage roll, or alternately advanced to a fabricating station to be converted into bags, for example.

Figure 5:
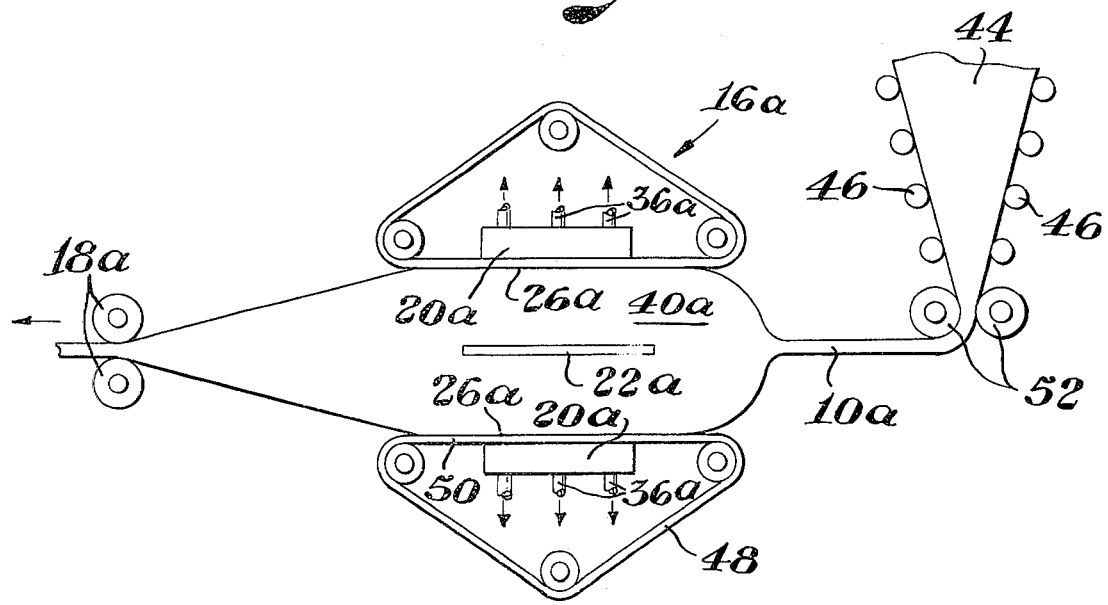
FIG. 5 is a view like FIG. 1 only showing the practice of the invention in line with the manufacture of the film by the so-called bubble process, and additionally illustrates a modification to the tube gusseting station.

Referring now to certain practices where the use of vacuum suction sources, as described above, would create too strong of a physical drag on the film, the problem can be overcome by employing the modification to the invention as shown in FIG. 5.

The FIG. 5 embodiment is described particularly in relation to the manufacture of plastic tubing by the well-known and extensively practiced bubble process. The in-line operation can include the use of a standard film forming extruder (not shown) which extrudes a plastic melt in the form of a continuous inflated tube or bubble, as shown partially at 44, and which is eventually flattened such as by use of a suitable collapsing rack 46. Thereafter the tube is fed through a modified gusseting station 16a.

The station 16a is comprised of opposed continuous belts 48 which are set in spaced apart, generally face to face, relationship. Alternately, belts 48 can be set in a "V" configuration as described before with regard to the FIG. 1 embodiment, or can be set in any other configuration so long as the same serve to "open" the tube in a manner compatible with the inward tucking step.

The inner run 50 of each belt slides across a vacuum suction source 20a. The sources 20a, which can be of a structure as generally described supra, communicate through the belts, respectively, to apply a vacuum suction to select opposite surface areas or sections 38a of the tube, to open the tube and permit the same to be gusseted with the assistance of gusseting blades 22a, for example. In order to transmit the vacuum suction, belts 48 can be made perforate such as by cutting apertures therein, or by constructing the same from perforate material such as a woven material, wire mesh, or the like. The belts are operated at essentially the same speed as the forward movement of the tubing to avoid placing drag thereon.

The necessary amount of gas pressure within the tube can be maintained and replenished by adjusting the spacing between a pair of idler rolls 52 located adjacent the terminating extent of collapsing rack 46. Spacing between such rolls permits gas to leak from bubble 44, and enter the tube on the opposite side of rolls 52, to maintain sufficient internal pressure to facilitate the gusseting of the film at station 16a.

Where it may become necessary to minimize physical drag on the film even to the extent as is applied by blades 22a, such blades can be eliminated from the practice of the FIG. 5 embodiment, and the film tucked inwardly by means solely of atmospheric pressure. In this latter species practice hereof, a negative gauge pressure is maintained within the tube in the vicinity of station 16a. Such negative gauge pressure is balanced with the degree of vacuum suction applied through belts 48, so that a sufficient differential pressure exists to open the tube as it passes through the gusseting station. Atmospheric pressure acting cooperatively with the vacuum suction, inwardly collapses those sections 40a of film not being held by vacuum, to continuously tuck such non-held or free sections into the tube to form a gusset structure.

As an alternate mode of practice, a negative gauge pressure can be employed within the tube, but with the provision of gusseting blades 22a. The blades 22a assisted by the inward bias provided by atmospheric pressure, thus serve to inwardly tuck the film, while permitting minimal blade pressure against the film. The blades 22a may also be employed, of course, in combination with positive gauge pressure within the tube as indicated above, and in the manner as described with regard to the FIG. 1 embodiment hereof.

Figure 6:
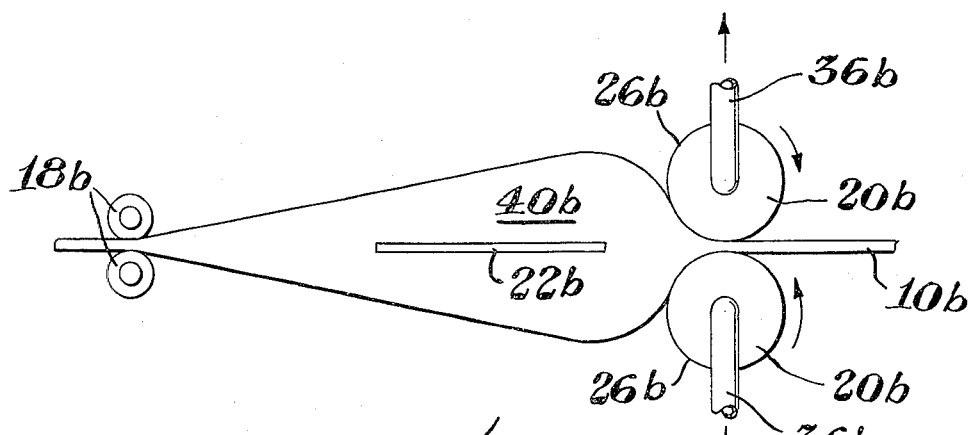
FIG. 6 is a partial side elevational view illustrating yet another modification to the tube gusseting station as contemplated in the preferred practices of this invention.

As still another modification to the method and apparatus described herein, FIG. 6 illustrates a gusseting station 16b adapted to minimize any disturbance of the internal pressure within the tube as may be caused by defects in the tube wall, such as, for example, a pinhole type defect or the general equivalent thereof. The embodiment of FIG. 6 is particularly designed to minimize deflation of the tube in the event a pinhole passes across a vacuum suction face. To this end modified vacuum suction sources are provided in the form of hollow rolls 20b each having cylindrical vacuum suction faces 26b. Faces 26b are comprised of porous or a like material transmittable to air. The hollow rolls 20b can be internally vacuumized by air sucked axially out one end thereof such as through vacuum hoses 36b, respectively. The noted porous material preferably comprises a fused porous metal such as, for example, sintered bronze. The porous nature of the material permits a vacuum to be drawn therethrough, by internally vacuumizing the hollow rolls 20b, thus creating a vacuum suction at faces 26b, respectively. However, the rate air is sucked through faces 26b is restricted which, in turn, limits the deflation effect caused by a pinhole passing across either vacuum suction face 26b.

By way of yet a further illustration of the invention, vacuum boxes of the general type illustrated in FIG. 1, except for elimination of the internal dividers, are constructed of wood, and each extend 16 inches in the direction of advancement of the film, are 4 inches deep, and 16 inches in height. The aperture in each vacuum suction face is 14½ inches by 6 inches, and is covered by a copper wire mesh of 16 mesh size. The vacuum sources are commonly operated by a Spencer turbine compressor of 7½ h.p. The boxes are placed in a V configuration of FIG. 1, to the end of successfully gusseting 12-3/16 inch layflat width tubing of 1.5 mil thickness, and which is fed off a mill rill at approximately 40 ft./min. The compressor is operated at full power in combination with a pressure of about 0.1 psig maintained with the tubing. The gusseting blades can be generally of the configuration illustrated in FIG. 3.

It can be well appreciated that the attached drawing and accompanying description is intended only to illustrate representative and preferred embodiments of the practice of this invention. Accordingly, it can be understood that various changes can be incorporated therein as made obvious by this disclosure, and are fairly within the scope of the general teachings, principles, and mode of operation of the gusseting apparatus and methods hereof.

What is claimed is:

1. In the method of gusseting a flexible tube, the steps of:
   i. continuously advancing the tube,
   ii. selectively applying a vacuum suction to opposed exterior surface areas of the tube to open the tube,
   iii. leaving a select exterior surface area of the tube free of the application of said vacuum suction
   iv. maintaining a negative gauge pressure within said tube in the vicinity of said vacuum suction applying step; and
   v. continuously inwardly tucking said free surface area to form a gusset structure in the tube, by means of inward collapse of said free section induced by atmospheric pressure acting cooperatively with the negative gauge pressure maintained within the tube.

2. The method of claim 1 where said vacuum suction step comprises applying vacuum suction faces to the tube which move at generally the same speed as the speed of advancement of the tube.

3. The method of claim 1 wherein said inward tucking step is solely by inward collapse of said free sections via atmospheric pressure acting cooperatively with the application of said vacuum suction and the negative gauge pressure within the tube.

4. The method of claim 1 wherein said inward tucking step comprises applying guiding means to the tube to inwardly tuck said free surface area assisted by the bias of atmospheric pressure bearing inwardly on the tube.

* * * * *